(12) United States Patent
Schilling

(10) Patent No.: US 7,621,147 B2
(45) Date of Patent: Nov. 24, 2009

(54) HEAT RECYCLING SYSTEM WITH NIGHTTIME COOLING RECOVERY

(75) Inventor: Heinz Schilling, Kempen (DE)

(73) Assignee: Heinz Schilling KG, Kempen (DE)

( * ) Notice: Subject to any disclaimer, the term of this patent is extended or adjusted under 35 U.S.C. 154(b) by 243 days.

(21) Appl. No.: 11/360,246

(22) Filed: Feb. 22, 2006

(65) Prior Publication Data

US 2006/0185383 A1    Aug. 24, 2006

(30) Foreign Application Priority Data

Feb. 23, 2005   (DE) .................. 10 2005 008 565

(51) Int. Cl.
    *F25D 17/06*   (2006.01)
(52) U.S. Cl. .......................................... 62/428; 62/434
(58) Field of Classification Search ................. 62/428,
    62/412, 434, 271, 59, 270, 333, 426, 427,
    62/430, 179, 201, 435, 99; 165/48.1, 52,
    165/59, 66, 166; 454/237–253
    See application file for complete search history.

(56) References Cited

U.S. PATENT DOCUMENTS

| 4,119,142 | A | | 10/1978 | Margen | |
| 5,179,998 | A | * | 1/1993 | Des Champs | ................ 165/222 |
| 5,718,122 | A | * | 2/1998 | Maeda | ......................... 62/185 |
| 5,987,908 | A | * | 11/1999 | Wetzel | ...................... 62/259.1 |
| 6,209,622 | B1 | * | 4/2001 | Lagace et al. | .................. 165/8 |

(Continued)

FOREIGN PATENT DOCUMENTS

DE    2657245    12/1976

(Continued)

OTHER PUBLICATIONS

Recknagel-Sprenger-Schramek, 1997, 1998, S. 1347, 1348 (with machine translation).

(Continued)

*Primary Examiner*—Mohammad M Ali
(74) *Attorney, Agent, or Firm*—Chadbourne & Parke LLP; Walter G. Hanchuk

(57) ABSTRACT

The invention concerns a heat recycling system comprising at least one exhaust air heat exchanger mounted inside the exhaust air flow of a ventilating and/or air-conditioning plant, especially of a building or a portion of a building, and at least one outside air heat exchanger mounted within the intake air flow of such unit, whereby the heat exchangers are integrated within the circuit, whereby for the production of cold, especially nighttime cold from outside air at least one partial circuit can be segregated from the integrated circuit, in which circuit is mounted one of the heat exchangers, especially an exhaust air heat exchanger, through which the outside air can be channeled in order to cool the fluid in said partial circuit, whereby the partial circuit features at least one heat exchanger, through which the cold so recovered can be channeled into a cooling circuit. The invention further concerns a process for the recovery of nighttime cold out of outside air by means of an integrated circuit heat recovery system whereby outside air is channeled through the exhaust air heat exchanger in order to withdraw the cold from outside air by means of the fluid in the exhaust air heat exchanger and channel it in particular by way of a heat exchanger into a cooling circuit.

10 Claims, 2 Drawing Sheets

U.S. PATENT DOCUMENTS

| | | | | |
|---|---|---|---|---|
| 6,237,354 | B1 * | 5/2001 | Cromer | 62/271 |
| 6,619,063 | B1 * | 9/2003 | Brumett | 62/264 |
| 6,915,649 | B2 * | 7/2005 | Amaral et al. | 62/244 |
| 6,918,263 | B2 * | 7/2005 | Lee et al. | 62/271 |
| 7,073,566 | B2 * | 7/2006 | Lagace et al. | 165/8 |
| 7,150,314 | B2 * | 12/2006 | Moffitt | 165/249 |

FOREIGN PATENT DOCUMENTS

| | | | |
|---|---|---|---|
| DE | 4408087 | A1 | 9/1995 |
| DE | 202004014827 | U1 | 2/2005 |
| SE | 9304084 | A | 7/1995 |
| SE | 9402901 | A | 3/1996 |

OTHER PUBLICATIONS

English translation of SE 9304084 A (Abstract only) from Database WPI Week 199539, Thomson Scientific, London, GB; AN 1995-301456, XP 002484562.

English translation of SE 9402901 A (Abstract only) from Database WPI Week 199621, Thomson Scientific, London, GB; AN 1996-208071, XP 002484563.

English translation of DE 4408087 A1 (Abstact only) from DEPATISnet.

English translation of DE 20 2004014 827 U1 (Abstract only) from SYSTRAN tranlation software.

European Search Report.

* cited by examiner

HEAT RECYCLING SYSTEM WITH NIGHTTIME COOLING RECOVERY

FIELD OF THE INVENTION

The invention concerns a heat recycling system comprising at least one exhaust air heat exchanger, mounted inside the exhaust flow of a ventilating and/or air-conditioning unit, especially of a building or a portion of a building, and at least one outside air heat exchanger, mounted within the intake air flow of such unit, whereby the heat exchangers are integrated within the circuit.

BACKGROUND OF THE INVENTION

In the known state of the art, ventilating and air-conditioning units, such as are employed for example in buildings, are as a rule outfitted with heat recycling systems, whereby the heat of the spent exhaust air, especially in the Winter, is extracted by way of a heat exchanger system and conveyed if need be onto the outside air to be heated up. Different systems are available to this end. One advantageous system which has been established is the integrated circuit system wherein one heat exchanger is located in the exhaust air, the so-called exhaust air heat exchanger, to extract the heat from the spent exhaust air, and one heat exchanger in the outside air, the so-called outside air heat exchanger, to deliver the heat recovered from the exhaust air. In the present state of the art, these systems essentially serve exclusively for the recycling of heat.

Known as an added function is, for example, the indirect adiabatic evaporative cooling, wherein when there is a need for cold to cool the outside air, the expelled exhaust air is adiabatically cooled in a water evaporator device, and such relative cold is channeled from the exhaust air by way of the integrated circuit onto the warmer outside air.

Similarly, these efficient heat exchanger systems permit other functions, which may be located within the heat exchangers themselves or in the integrated circuit, as for example the integrated after-heating or after-cooling on the wet end, a system for desiccation cooling and desiccation cold recycling, the uptake of circulating cold for free cooling, for refrigerating machine cold recovery as well as the integration of naturally present heat and cold potentials in the circuit for heating and cooling of air.

Another important energy-saving function in ventilation plants is the so-called nighttime cold cooling, that is to say, for example in the Summertime, when the overnight temperature is distinctly below the daytime temperature, channeling directly into the rooms of a building at nighttime the colder outside air through ventilating ducts. In such a nighttime-cold cooling, the installed heat recovery system may remain inactive, that is to say, the heat recovery system may be completely shut off or to say the least, the heat recycling output may be reduced by adjusting the quantity of water circulating in the integrated circuit.

SUMMARY OF THE INVENTION

As of this time, the available heat recovery systems are incapable, along with nighttime cold cooling by means of the cold outside air, to operate in particular simultaneously a nighttime cold recovery, for the reason that when the heat recovery system is switched on, as the nighttime cold is withdrawn from the integrated circuit, heat would again be automatically switched on from the outside air intake.

Accordingly, the task of the invention is to construct a heat recovery system within the integrated circuit in such a way that a recovery of nighttime cold becomes feasible, in particular simultaneously with nighttime cold cooling, so that with the recovered cold it may be for example feasible to cool portions of the structure separately, if need be after intermediate storage of the cold or even to combine the use of the cold during peak-load daytime periods.

The task of the invention is resolved in that in a generic heat recovery system with an integrated circuit for the extraction of cold, especially nighttime cold, from outside air, a portion of the circuit may be separated from the integrated circulatory cycle, in which one of the heat exchangers, in particular an exhaust air heat exchanger, is located, through which it is possible to channel outside air, in order to cool the fluid in this portion of the circuit, whereby this portion of the circuit features at least one heat exchanger by which the recovered cold may be channeled into a cooling circuit.

Accordingly, a material feature of the invention is for an existing heat recovery system within the integrated circuit to be constructed in such a way that the integrated circuit may be separated between the bilateral heat exchangers, thereby creating at least one partial circuit in which only one of the heat exchangers of the integrated circuit is located. This makes it feasible to switch off the heat recovery system within the integrated circuit as far as the function of heat recovery is concerned, and to utilize it for cold recovery once it is switched over.

To this end, the outside air, especially at nighttime in the summer, is channeled through one of the heat exchangers of the now switched-over partial circuit, so as to cool the fluid in the partial circuit and make the cold so recovered available for other tasks. To this end, in the claimed inventive embodiment, another heat exchanger may be arranged in the partial circuit so created, by which to extract the cold recovered in this partial circuit and channel it to other tasks.

The recovered cold, channeled from the partial circuit into the cooling cycle, may accordingly be utilized to cool, for example, special portions of the structure or groups of structures, but also and especially after storage in a cold storage system arranged within this cooling circuit, it may be utilized to afford during peak daytime loads supplementary cooling, for example in the rooms of a building.

The aforesaid cold storage may for example be constructed of a container in which it is possible to store a larger volume of the cooled fluid, so that when the need arises for the cold or cooling, the cooled fluid may be extracted from a lower connection of the cold storage and following a cooling function channeled back to the warmer fluid in the upper portion of the cold storage.

What is material for the aforesaid aspect of the invention is merely that at least one of the two heat exchangers within a heat recovery system is utilized, especially the recovery of nighttime cold for the recovery of the cold. In principle, it is possible to utilize both the outside air heat exchanger as well as the exhaust air heat exchanger for this purpose.

Within the framework of the invention described here, it is important to mention that the chosen terminology, for example exhaust air heat exchanger and outside air heat exchanger, is derived from the particular function of these structural parts in the heat recovery operation. Hence, the term outside air heat exchanger is understood to mean the heat exchanger of the integrated circuit through which fresh air siphoned from the outside is channeled. The term exhaust air heat exchanger is understood to mean the one through which spent exhaust air coming out of the building is channeled in the heat recovery operation. The same terminology for such heat exchangers will be retained also for the cold recovery function described hereunder.

In a preferred embodiment of the invention, provision may be made for the existing integrated circuit of the heat recovery system, that is, the fluid circuit between the bilateral heat exchangers, to be capable of separation into two partial circuits, whereby the exhaust air heat exchanger is arranged in one partial circuit and the outside air heat exchanger in the other, whereby for purposes of direct intake of outside air into a ventilating and/or air conditioning plant, for example into the building or a portion of the building, the outside air heat exchanger is traversed by outside air and whereby for purposes of recovery of cold from the outside air the exhaust air heat exchanger is traversed by outside air.

Provision may also be made for the outside air siphoned into the building for direct nighttime-cold cooling to be channeled over a bypass in the outside air heat exchanger.

These embodiments according to the invention have a special advantage in that two functions may be simultaneously accomplished with the existing heat recovery system in the cooling operation, to wit for one thing the direct room and/or building cooling by way of direct introduction of cold outside air into the facility, especially through the outside air heat exchanger or even bypassing the same, for which it is basically feasible to utilize the existing ventilation system.

For the other thing, simultaneously with the operation of the direct nighttime cold cooling it is also feasible to carry out nighttime cold recovery, to wit by channeling cold outside air through the exhaust air heat exchanger and extract by way of the fluid in the partial circuit of this heat exchanger the cold from outside air and channel it into the cooling circuit by way of the additional heat exchanger mounted in this partial circuit.

Accordingly, it is possible to undertake cooling of a building for example at nighttime during the Summer, while at the same time make cold available either directly as needed, or stored so as to make cooling available as needed, for example in daytime, either for cooling of room air, since provision may be made for the possibility of channeling the stored cold by way of the same previously mentioned heat exchanger or another one into the then running integrated circuit, and thereby to the outside air heat exchanger, or supply it in daytime for other functions according to need, as for example cooling a portion of the structures.

In order to make it possible for the two cooling functions, namely the nighttime-cold cooling and the nighttime cold recovery, in particular to be carried out simultaneously, provision may be made according to an advantageous embodiment of the heat recovery system according to the invention to subdivide the pumping output required for the heat recovery operation in the integrated circuit onto two pumps, mounted at all times in one of the partial circuits, onto which the cooling operation may be switched. What this accomplishes is that during an operation in which the customary integrated circuit is switched from heat recovery to a cooling function, the two existing partial circuits feature their own pumps, so as to support these circuits independent the one from the other.

To this end, essentially during the cooling operation, one pump is mainly required for the cold recovery, in order to secure cycling of the fluid through the exhaust air heat exchanger fed by the outside air. The pump, mounted in the partial circuit of the outside air heat exchanger may be for example turned on according to need, for example when the outside air is too cold for direct space cooling and is in need of after-heating, to which end provision can be made for a device to heat outside air in the partial circuit of the outside air heat exchanger. This device may also be a heat exchanger.

The aforementioned cold storage may be utilized precisely in conjunction with the said after heating as needed, particularly of the outside air siphoned in at nighttime.

The cold storage heats up especially when daytime withdrawal of cold is needed from same. The heat then stored in the cold storage may, in a preferred embodiment, be withdrawn for example at night, to channel it to other tasks by way of the fluid in the storage container, in particular to heat outside air channeled for example at night for direct night-cold cooling in a building.

To this end, the fluid may be channeled from the cold storage which then functions as a combination cold/heat storage to a heat exchanger mounted in the partial circuit of the outside air heat exchanger, serving as the previously described device for the heating of outside air. In this manner, the after-heating of outside air may achieve the predetermined minimum temperature of the air fed in from the outside.

Again, by way of such after-heating, heat is withdrawn from the cold/heat storage, whereby the latter cools off and the cold so produced in stored. Accordingly, the cold stored in the cold storage may stem, in a preferred embodiment, both from the process of after-heating of outside air in direct night-cold cooling and from the previously described process of cold generation with the aid of the exhaust air heat exchanger.

Accordingly, the use of the cold/heat storage according to the invention may alternatively store cold and heat in daytime/nighttime operation.

To the extent that this latter function should appear dispensable, provision can also be made for the pump output required for a heat recovery system to be accomplished by merely one single pump, which in any event is mounted when switched over to a cooling operation within the part circuit devoted to the production of cold.

In the existing heat recovery systems, provision is customarily made for a blower to be installed to convey the air through the ventilating and/or air conditioning plant, especially within a building. To this end, the blower may for example be mounted downstream of an exhaust air heat exchanger (with the exhaust air heat exchanger located on the suction end of the blower) or upstream of an exhaust air heat exchanger (with the exhaust air heat exchanger located on the compression end of the blower).

Accordingly, in such heat recovery systems consistent with the invention, provision can be made for a blower to be mounted downstream of the exhaust air heat exchanger, by means of which outside air is suctioned in, whereby the incoming stream of outside air may be subdivided into a first partial stream, fed through the outside air heat exchanger into the plant, for example into the building or a portion of the building, and a second partial stream leading outwards through the exhaust air heat exchanger, whereby it is possible here in particular to adjust the ratio of the subdivision of the outside air flow in the two partial streams, provision for which can be made by means of suitable valves or dampers in the corresponding air ducts.

Inasmuch as in the operation of the ventilation system with heat recovery plants it is customary for the outside air flow suctioned in by the blower to be channeled entirely through the building and then through the exhaust air heat exchanger, provision may then be made in order to achieve the aforesaid functions, for the partial stream channeled in the cooling operation through the blower, fed for direct cooling through the building, to be shifted by way of a bypass in the exhaust air heat exchanger, in order to make it possible for the exhaust air heat exchanger to be impacted exclusively by cold outside air.

In another embodiment according to the invention, provision can also be made for a blower to be mounted upstream of the exhaust air heat exchanger to convey in the heat recovery operation the entire air stream and which, in the cooling operation, channels the entire outside air flow serving the direct cooling of the building, whereby a separate blower is subordinated to the exhaust air heat exchanger, which conveys solely the outside air flow to the production of cold, so that the two outside air flow volumes may be adjusted the one independent of the other. This is essentially accomplished by an appropriate volume regulator in the affected blowers.

BRIEF DESCRIPTION OF THE DRAWINGS

The following drawings illustrate two exemplified embodiments of the invention.

DETAILED DESCRIPTION

Figure 1:
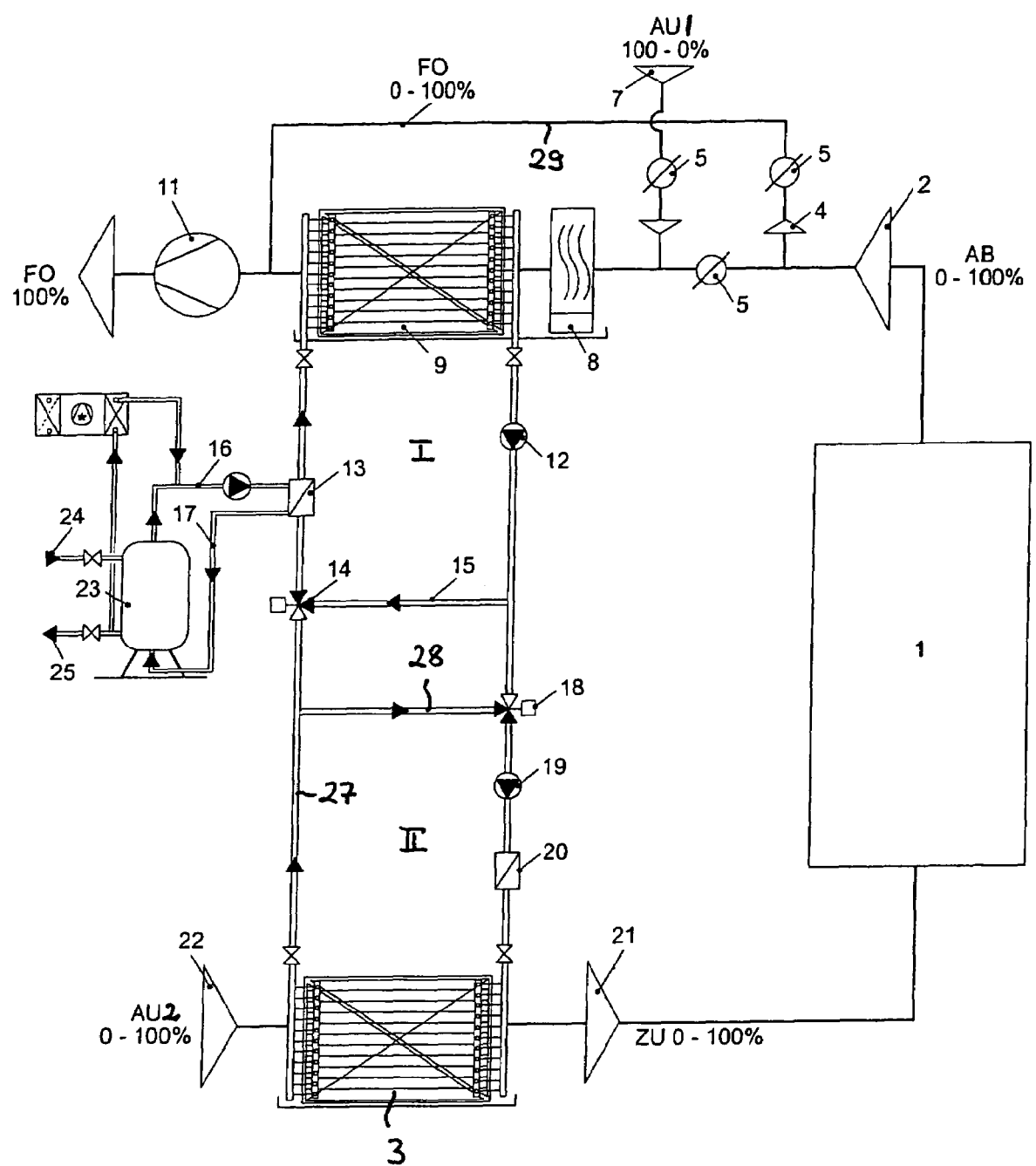
FIG. 1 shows a ventilation plant with a heat recovery system in cooling operation, wherein the total incoming outside air flow is subdivided on the one hand for direct cooling and on the other for cold production.

FIG. 1 shows a ventilation plant with heat recovery system in an integrated circuit wherein an exhaust air heat exchanger 9 is integrally connected in a known way to an outside air heat exchanger 3, that is to say, that heat can be extracted from the exhaust air stemming from a building area 1 by way of the exhaust air heat exchanger 9, in that the same is transferred onto a fluid heat carrier medium, whereby this fluid carrying the heat is conveyed by means of the pumps 12 and 19 illustrated here to the outside air heat exchanger 3 through the existing integrated circuit, in order to transfer the heat so recovered to the outside air 22. The fluid thus cooled off is fed through the integrated circuit to the exhaust air heat exchanger 9 by way of the duct 27.

During this operation, outside air is suctioned in by means of the illustrated blower 11, mounted downstream of the exhaust air heat exchanger 9, then channeled through the outside air heat exchanger 3 into a building area 1 as intake air 21, whereby the same volume of exhaust air 2 stemming from the building is channeled outward through the exhaust air heat exchanger 9 and the blower 11. Consistent with the state of the art, there is hence the possibility to create a routine heat recovery operation in an integrated circuit.

According to the invention, this existing heat recovery system can be switched over in order to permit a cooling activity for example in summertime night operations. To this end, for example, the integrated circuit between the two heat exchangers 3 and 9 is interrupted, at least with the three-way valve 14, and possibly at the same time with the three-way valve 18, so that in this operating mode on the one hand there is created a partial circuit I by way of the pump 12, the duct 15, the three-way valve 14, the heat exchanger 13 and back to the heat exchanger 9, and on the other a partial circuit II by way of a pump 19, a possible heater/heat exchanger 20 through the heat exchanger 3, a duct segment 27 and a duct segment 28 as well as the three-way valve 18 back to the pump.

According to the invention, provision can now be made for the part circuit I to be switched on so as to achieve nighttime cold production. To this end outside air is suctioned in by means of the blower 11, whereby this entire 100% outside air flow is subdivided into a first partial air flow AU1 of 100-0% and a second partial air flow AU2 of 0-100%. The ratio of the partial air flows to each other can be essentially regulated with the aid of the ventilation dampers 5.

It will be observed here that the partial air flow AU1 suctioned in from the outside by way of the damper valve 5 reaches the exhaust air heat exchanger 9 and yields here its content of nighttime cold to the heat carrier fluid, which then yields by way of the partial circuit I the cold in the heat exchanger 13 to the cold circuit 16, 17, 23. The cold thus transferred in the cold circuit can be applied to other tasks, for example for direct cooling of building segments by way of the circuit links 24 and 25.

Provision can also be made by way of the cold storage 23 to cool a large volume of fluid which can be used as needed, even for daytime cooling. To this end, the cold can for example be channeled back into the integrated circuit also by way of the heat exchanger 13 or another heat exchanger, to be transferred to warm daytime air intake by way of the outside air heat exchanger 3. In order to avoid that a portion of the cold be directly channeled outdoors by way of the exhaust air heat exchanger 9, provision can be made in one mode of operation for a heat exchanger as here identified with the number 13 to be also mounted in circuit 2, for example as heat exchanger 20, to make sure that the stored cold be supplied to this circuit alone. Similarly, in contrast to the illustration here, the heat exchanger 13 can be mounted on the intake side of the pumps, so that in rechanneling the cold into the integrated circuit system, possibly by way of the heat exchanger 20, the cold may first reach the outside air heat exchanger.

It will be observed here that a partial flow of outside air AU 2 of 0-100% may be channeled directly through the outside air heat exchanger 3 into the building portion 1, whereby an equal volume of exhaust air 2 is channeled in direction 4 over the damper valve 5 by means of a bypass 29 of the exhaust air heat exchanger 9 on to blower 11, so that the two partial flows AU 1 and AU 2 again combine into a single total air flow.

Next, it will be observed in FIG. 1 that the standardized heat recovery system and integrated circuit provided here, together with the associated components, create a structure able to afford simultaneously both a night-cold cooling and a night-cold production, as well as in particular the storage of such cold, whereby the essential principle of the invention lies in the fact that the integrated circuit may be separated, in order to channel cold outside air through both heat exchangers of the heat recovery system and that such cold be devoted to different functions, on the one hand a direct cooling of the buildings and on the other the production and storage of cold.

Figure 2:
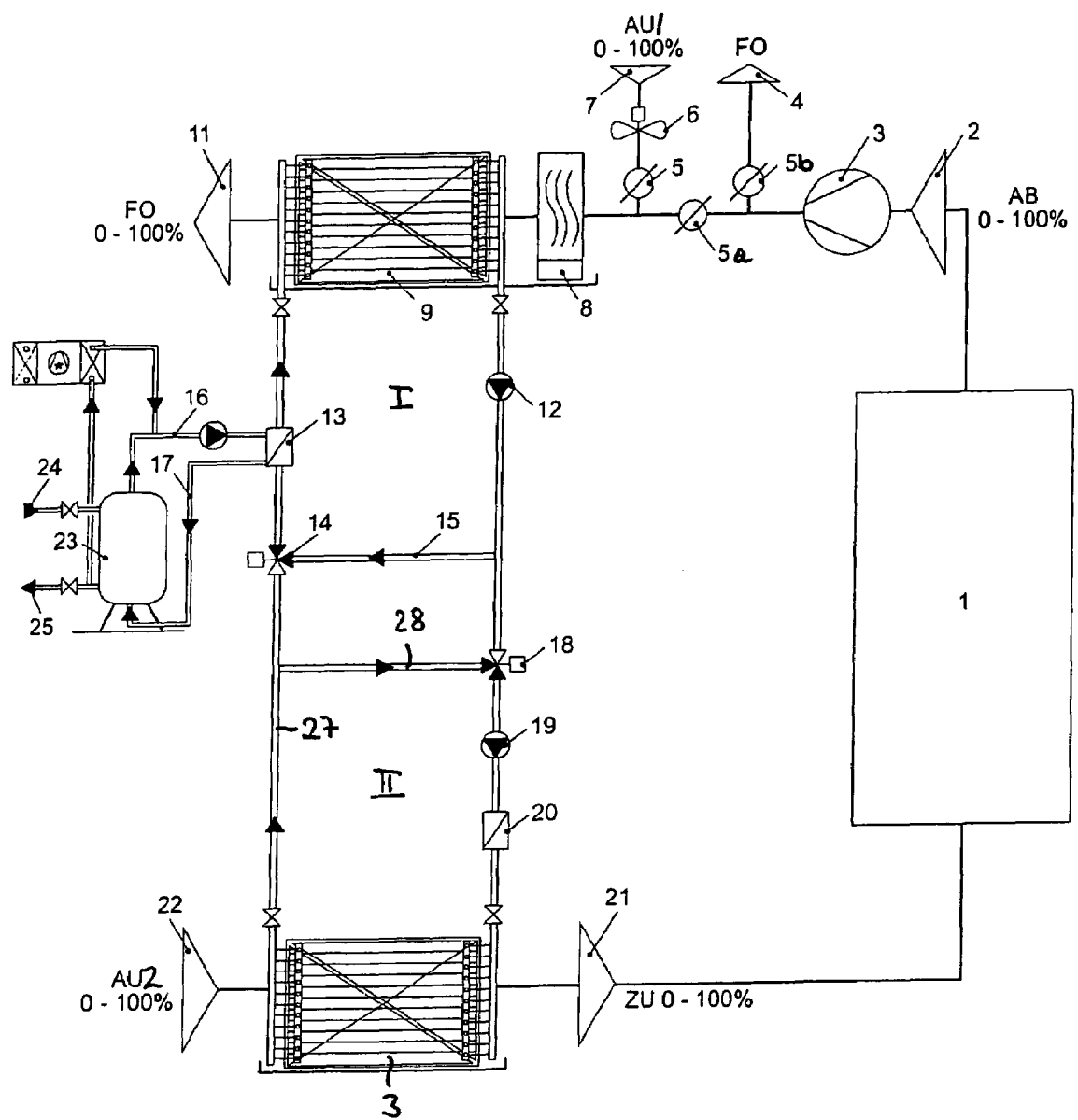
FIG. 2 shows a ventilation plant with heat recovery system in cooling operation, wherein the outside air flow for direct cooling and the outside air flow for cold production feature separate blower units.

FIG. 2 shows substantially the same heat recovery system and the same components as FIG. 1, but in contrast to FIG. 1, it features a blower 3 mounted upstream of the exhaust air heat exchanger which conveys 100% of the circulating air volume in heat recovery operations.

In order to enable the invented cooling operation of this heat recovery system, FIG. 2 illustrates a shutoff 5a provided between the exhaust air heat exchanger 9 and the blower 3 so that downstream of the shutoff 5a and upstream of the exhaust air heat exchanger 9 outside air 7 may be channeled to the exhaust air heat exchanger 9 by means of a separate ventilator and/or blower 6.

Accordingly, the damper system 5a mounted as a shutoff between the blower 3 and the exhaust air heat exchanger 9 ensures that the volume of air conveyed by blower 3 is independent of the volume of outside air conveyed by blower 8. Similarly, as already illustrated in FIG. 1, the volume of outside air conveyed by blower 6 ensures the recovery of nighttime cold in part circuit I, after switching over by way of valve 14 and if need be also by way of the three-way valve 18.

In this way, as already described in FIG. 1, provision can also be made for simultaneous direct nighttime cooling operation, since according to FIG. 2, with the aid of blower 3, it is now possible to convey independently the outside air 22 through the outside air heat exchanger 3 directly into the premises 1 of a building. This input of cool fresh air is then channeled outside as exhaust air 4 in the same volume as the heated exhaust air 2 by way of the damper system 5*b*.

In both embodiments according to the invention as per FIG. 1 and FIG. 2, provision can be made in part circuit 2 for a heating device 20, so that in case of need if the outside air 22 is excessively cold, the same can be heated by way of a heat exchange in the outside air heat exchanger 3 with the fluid conveyed in part circuit 2, and only then channeled to premises 1. This heating device can be a heat exchanger which, as previously outlined, can be utilized in conjunction with the cold/heat storage device 23.

It will also be seen that both with the embodiment according to FIG. 1 and also according to FIG. 2, provision can be made upstream of the exhaust air heat exchanger for an evaporator device 8, to achieve also a supplementary adiabatic exhaust air cooling.

In this way it is also feasible especially in the cooling mode, particularly at nighttime. To provide additional adiabatic cooling to the inflow of outside air, so that cold can then be withdrawn from this outside air 7 in the exhaust air heat exchanger 9 traversed by such outside air 7.

With the aid of the embodiment according to the invention, it is also possible for example to make sure that during daytime operation of the plant cooling of the entire integrated circuit of the outside air can be accomplished by adiabatic evaporator cooling of the exhaust air, whereby during peak load periods there is further the possibility of introducing stored cold from the cold storage 23 either in the integrated circuit system or to channel it over separate ducts 24, 25 to the building and/or portions of the building in need of cooling.

Both embodiments as per FIG. 1 and FIG. 2 evidence the inventive possibility for an existing heat recovery system to be switched over from the heat recovery function onto a function of cooling operation, permitting both direct cooling as well as cold production and if need be cold storage.

It should be understood that the above description is only representative of illustrative examples of embodiments and implementations. For the reader's convenience, the above description has focused on a representative sample of possible embodiments, a sample that teaches the principles of the present invention. Other embodiments may result from a different combination of portions of different embodiments.

The description has not attempted to exhaustively enumerate all possible variations. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent.

What is claimed is:

1. A heat recovery system comprising:
    at least one exhaust air heat exchanger, mounted in the exhaust air stream of a ventilation and/or air conditioning plant, and
    at least one outside air heat exchanger mounted in the intake air stream of the ventilation and/or air conditioning plant,
    whereby the at least one exhaust air heat exchanger and the at least one outside air heat exchanger constitute an integrated circuit configured to recover heat from the exhaust air,
    wherein there is at least one partial circuit separated from the integrated circuit configured to extract cold from the outside air during nighttime in which is mounted the at least one exhaust air heat exchanger, and wherein outside air cooled in an evaporator device for adiabatic cooling is channeled through the at least one exhaust air heat exchanger in order to cool a fluid in the partial circuit,
    whereby the partial circuit features at least one heat exchanger to transfer cold from the fluid in the partial circuit into a cooling circuit having a cold storage withdraw a cooled fluid during daytime.

2. The heat recovery system according to claim 1, wherein the integrated circuit is separated into at least two partial circuits, whereby the exhaust air heat exchanger is mounted in a first partial circuit and the outside air heat exchanger is mounted in a second partial circuit, and whereby the outside air is traversed by outside air for direct channeling of outside air into the ventilation and/or air conditioning plant, and whereby the exhaust air heat exchanger is traversed by outside air for the recovery of cold from the outside air.

3. The heat recovery system according to claim 2 wherein the pumping output required for the operation of heat recovery in the integrated circuit is subdivided over at least two pumps, one of which is mounted in each of the at least two partial circuits.

4. The heat recovery system according to claim 2 wherein a device for warming up the fluid is mounted in the second partial circuit of the outside air heat exchanger, in order to provide heating for the incoming outside air in the outside air heat exchanger.

5. The heat recovery system according to claim 1 further comprising a blower that is mounted downstream of the exhaust air heat exchanger, by which the outside air is suctioned in, whereby the entire outside air suctioned in is divisible into one first partial flow leading through the outside air heat exchanger into the ventilation and/or air conditioning plant, and a second partial flow leading through the exhaust air heat exchanger outward, whereby in particular the ratio of the subdivision of the outside air flow into the first and second partial flows can be adjusted.

6. The heat recovery system according to claim 5 wherein the first partial flow channeled through the ventilation and/or air conditioning plant, is channeled through a bypass on the exhaust air heat exchanger.

7. The heat recovery system according to claim 1 wherein upstream of the exhaust air heat exchanger there is mounted a blower which conveys the entire air flow in the heat recovery operation and which conveys in the cooling operation the entire outside air flow used to directly cool the building, whereby a separate blower is subordinated to the exhaust air heat exchanger which blower handles only the outside air flow to produce cold, so that the air flow volumes from the at least one outside air heat exchanger and the at least one exhaust air heat exchanger are independently adjustable.

8. The system of claim 1, wherein the at least one partial circuit is switchably separable from the integrated circuit and is configured to extract cold from the outside air during nighttime when switched into a separated condition.

9. A method for recovery of nighttime cold from outside air with the aid of an integrated circuit heat recovery system comprising:

channeling outside air over an evaporator device for adiabatic cooling and through an exhaust air heat exchanger in order to withdraw cold out of the outside air by means of a fluid in the exhaust air heat exchanger, wherein the integrated circuit is subdivided into two self-sufficient partial circuits, whereby the recovery of nighttime cold occurs by way of one partial circuit and channeling the cold by way of a second heat exchanger arranged in this partial circuit into a cooling circuit having a cold storage unit and storing the cold in the cold storage unit and withdrawing the cold stored in the cold storage unit during daytime as needed, and whereby the other partial circuit provides minimum temperature controlled or regulated nighttime-cold cooling by way of the outside air heat exchanger.

10. The method of claim 9 further comprising storing heat in the heat/cold storage unit, withdrawing stored heat from the heat storage as needed to warm up the outside air channeled in through the outside air heat exchanger in order to attain a minimum required temperature of the incoming air.

\* \* \* \* \*